United States Patent [19]
Penton

[11] 4,076,272
[45] Feb. 28, 1978

[54] RETRACTABLE CONDUIT SYSTEM

[75] Inventor: Michael O. Penton, Antioch, Calif.

[73] Assignee: Penton Hose Protection Systems, Inc., San Diego, Calif.

[21] Appl. No.: 742,318

[22] Filed: Nov. 16, 1976

Related U.S. Application Data

[63] Continuation of Ser. No. 589,166, June 23, 1975, abandoned.

[51] Int. Cl.² .............................................. B60D 1/08
[52] U.S. Cl. .................. 280/421; 137/355.12; 248/51
[58] Field of Search ................. 280/420, 421, 422; 248/51; 137/355.12, 355.16

[56] References Cited
U.S. PATENT DOCUMENTS

| | | | |
|---|---|---|---|
| 2,554,176 | 5/1951 | Edwards | 248/51 |
| 2,733,033 | 1/1956 | Gunderson | 248/51 |
| 2,948,450 | 8/1960 | Dobrikin | 280/421 |
| 2,971,528 | 2/1961 | Rocca | 137/355.23 |
| 3,165,336 | 1/1965 | Bigge | 280/421 |
| 3,650,545 | 3/1972 | Freed | 280/421 |
| 3,717,319 | 2/1973 | Schultz et al. | 248/51 |

Primary Examiner—David M. Mitchell
Attorney, Agent, or Firm—Roy L. Knox

[57] ABSTRACT

A system is provided for retracting and extending flexible hoses where the hoses are adapted to connect a fluid power system on a first vehicle to a fluid power receiving device on a second vehicle and the vehicles are connected together for traveling. A flexible hose mounted on a first one of the vehicles has an extensible portion of sufficient length to allow the hose to extend at least a maximum distance normally anticipated to occur between the vehicles during travel. A resilient member, also mounted on the first vehicle, has a first end connected to the extensible proportion of the hose and a second end connected to the first vehicle. The resilient member is adapted to extend and retract the extensible portion of the hose in proportion to variations in the distance between the vehicles. A housing mounted on the first vehicle covers both the resilient member and the extensible portion of the hose when the hose is fully retracted.

5 Claims, 7 Drawing Figures

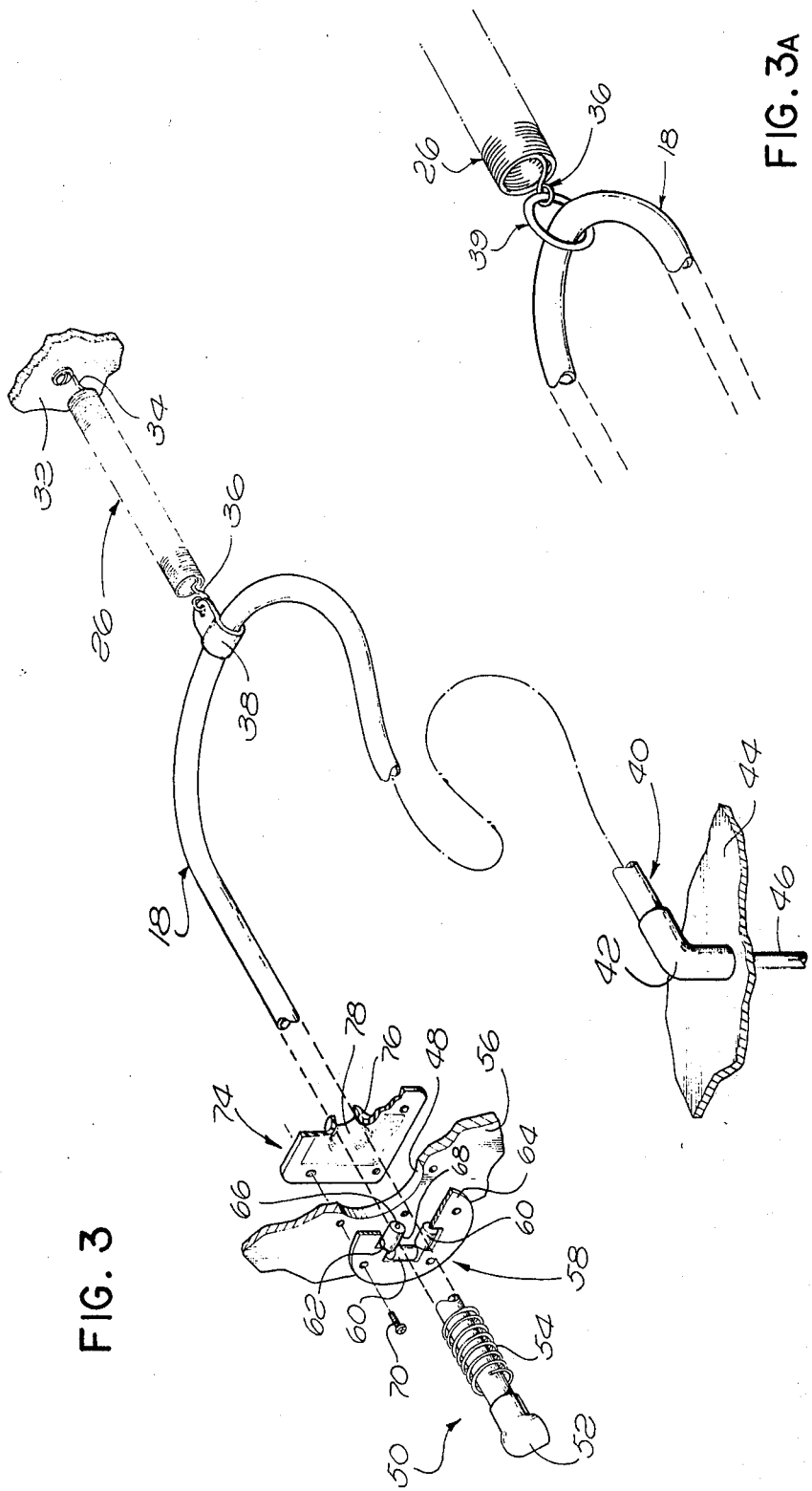

RETRACTABLE CONDUIT SYSTEM

CROSS REFERENCE TO RELATED APPLICATION

This application is a continuation of U.S. Pat. application Ser. No. 589,166 filed June 23, 1975 and now abandoned entitled "Retractable Conduit System."

BACKGROUND OF THE INVENTION

This invention relates to an apparatus for retracting and extending a flexible member, and more particularly to a system for at all times maintaining the proper amount of conduit connection between a fluid power system mounted on a first vehicle and a fluid power receiving device mounted on a second vehicle.

This invention is particularly useful in providing electrical, pneumatic or hydraulic connections, such as those required for braking systems, between a truck tractor and one or more detachable truck trailers. In a typical situation, the tractor has a pneumatic power braking system, including one or more fluid pressure outlets, to which hoses are connected for transmitting the effects of the fluid pressure to a fluid pressure receiving device, such as the pneumatic brakes, on a trailer pulled by the tractor. Because of the pivotal connection between the tractor and trailer, a certain amount of excess hose must be provided to take into account variations in the distance between the hose connections. This excess hose is usually allowed to either hang loosely between the tractor and trailer or is formed into a coil which has a resiliency of its own. In this manner, an excess of hose is available when the tractor and trailer assume different positions with respect to each other during turning or when occupying different levels on the terrain.

Such current methods, however, fail to provide the protection necessary to such hoses, both during use and storage, with the result that the hoses wear through by abrading against adjacent parts of the truck or trailer, are cut when caught between moving parts of the tractor and trailer, or otherwise become damaged. This necessitates changing the hoses annually as a safety precaution against more disastrous effects where hoses break unexpectedly which effects include brake locking due to the failsafe configuration employed in current tractor-trailer systems. According to a recent survey, twenty one percent of all truck accidents were caused by brake failure resulting in an average damage to the tractor-trailer unit of over $2,000.00. Thirty five percent of these brake failures were known to be due to some type of failure in the hydraulic or pneumatic connecting systems between the tractor and trailer. Such loss figures do not include other damages, such as personal injury, property loss, and loss of time.

SUMMARY OF THE INVENTION

An apparatus is provided for retracting and extending a flexible member which is adapted to be connected between a plurality of vehicles where the vehicles are to be collectively moved. The flexible member is mounted on a first one of the vehicles and is sufficiently long to extend at least the maximum distance normally anticipated to occur between the first and second vehicles during their movement. A resilient member has a first portion connected to the flexible member and second portion connected to the first vehicle to retract the flexible member after extension thereof in proportion to variations in the distance between the first and second vehicles.

In one embodiment of the invention, the flexible member is a hose which is adapted to connect a fluid power system on the first vehicle to a fluid power receiving device on the second vehicle where the vehicles are adapted to be fastened together for traveling. The flexible hose has an extensible portion mounted on the first vehicle which is of sufficient length to extend the maximum distance normally anticipated to occur between the vehicles during travel. The resilient member is a spring or a cylindrical rubber tube having a first end connected to the extensible portion of the hose. A housing covers the resilient member and the extensible portion when the flexible hose is fully retracted.

BRIEF DISCRIPTION OF THE DRAWINGS

The invention may best be understood when considered in light of the following detailed description taken in conjunction with the accompanying drawings, wherein:

FIG. 3 is an exploded, perspective view of some of the elements of the retractable conduit system shown in FIG. 2;

FIG. 3A is a perspective view showing an alternate method of attaching the spring to the hose;

DETAILED DESCRIPTION

The system of this invention provides a rigid housing mounted on either a truck tractor or trailer, and in some cases a housing mounted on both. Such housings enclose the hoses or conduits, such as brake hoses, connecting the truck tractor and trailer as well as a mechanism for resiliently maintaining excess hose within the housing. In this manner a constant tension is maintained on the hoses when they are operatively connected in order to pull slack out of the hoses and into the housing while at the same time permitting extension of the hoses when required. In addition, all of the hose necessary to connect the truck tractor and trailer is maintained within the housing when the hoses are not in use.

In one embodiment of the invention, tension springs are mounted on the truck tractor within the housing and secured at one end to loops of excess hose within the housing so that the free ends of the hoses may be extended from the housing, under tension and affixed to appropriate fittings on the trailer. When the hoses are released or when the distance between the tractor and trailer is decreased, such as by turning corners, the springs take up the slack by pulling the excess hose into the housing in order to avoid exposed loops of hose which could be readily damaged.

The hoses or conduits employed with this invention may provide various types of connections between the truck tractor and trailer or between the truck trailers and in the latter case for purposes of this disclosure and claims, a first truck trailer vehicle can be considered the tractor vehicle for a second truck trailer vehicle. For example, the conduit might conduct electrical, hydraulic or pneumatic power. In the embodiments of the invention shown and described herein, by way of example, the hoses connecting the truck tractor and trailer are described as conducting pneumatic power from the truck tractor to the trailer brakes. However, it will be understood that various types of flexible conduits may be employed for various other purposes with the retractable conduit system of this invention, and adapted for connection between various types of vehicles, all within the scope of this invention.

Figure 1:
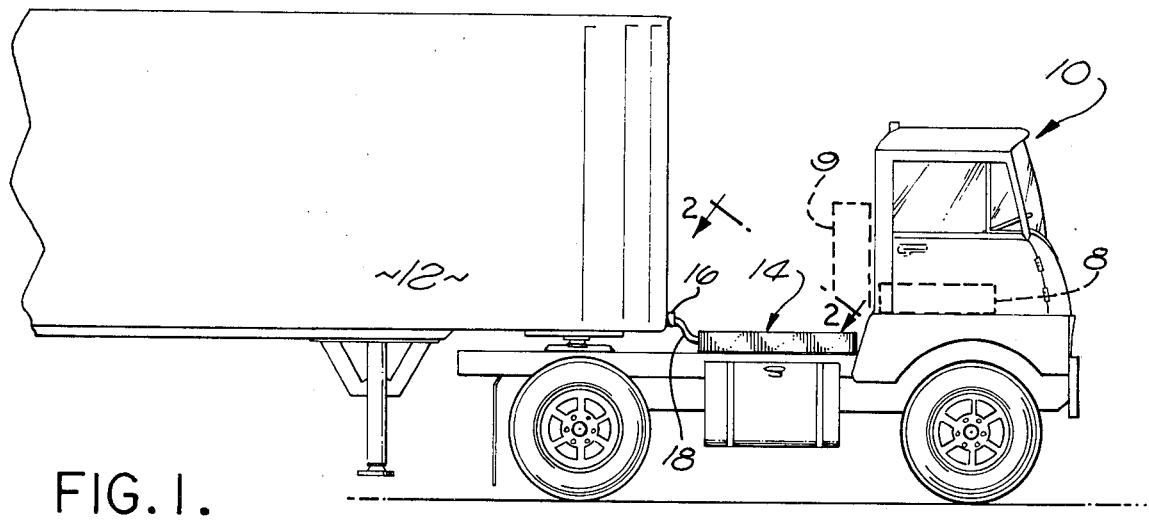
FIG. 1 is a schematic elevational view of a typical truck tractor and trailer combination having the retractable conduit system of a first embodiment of this invention mounted behind the truck tractor.
Figure 2:
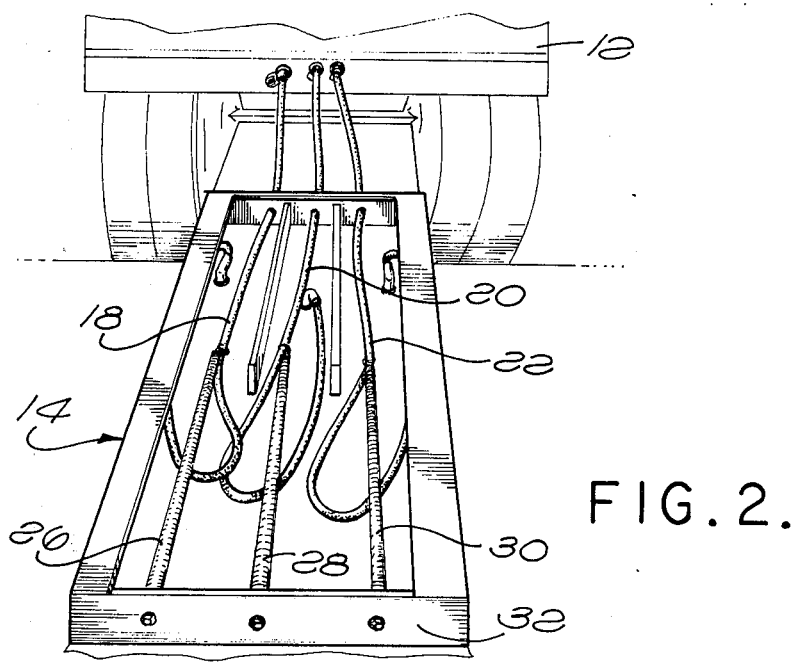
FIG. 2 is a perspective view taken along the line 2—2 of FIG. 1 with the conduit system housing cover removed.

More specifically, in the embodiment of the invention shown in FIG. 1, the retractable conduit system is contained within housing 14 mounted on the flat bed of the truck tractor 10. Hose 18 is shown extending from the housing and connected to couplings 16 carried by the truck trailer 12. The trailer is pivotly secured to the tractor in any number of ways known to those skilled in the art for movement with the tractor. The placement of the retractor housing 14 may be varied. For example, the housing may be positioned within a space provided in the cab area of the tractor or vertically behind the cab unit as is indicated by the dashed lines 8 and 9, respectively, in FIG. 1. Additionally, the retractor housing might be positioned on or in the trailer to provide connection to the tractor or to additional trailers, or both. Where the housing is positioned vertically behind the cab or between trailers, a substantial saving in the overall tractor-trailer length is obtained by permitting a closer coupling between the tractor and trailer or between the adjacent trailers. For example, by utilizing a housing mounted vertically as is shown at 9 in FIG. 1, the tractor and trailer may be coupled about one and one-half feet closer together. This results in the ability to employ longer trailers thus substantially increasing the pay load of the entire tractor-trailer assembly. In the first embodiment of the invention shown in FIGS. 1-13, tension springs 26, 28 and 30 have one end secured to hoses 18, 20 and 22 respectively within the housing and their opposite ends secured to a first end wall 32 of the housing 14. One of these hose and spring combinations is shown in greater detail in FIG. 3 where the spring 26 has a first end 34 connected to the first end wall 32 by welding, a bolt, a clamp, or the like (not shown). A second end 36 of the spring 26 is affixed to the hose 18 by a clamp 38 so that the spring and clamp will be pulled towards the housing exit as the hose end 50 is pulled away from the housing 14. Alternatively, the clamp 38 could be a loose fitting structure, such as a loosely fitting ring 39 allowing the hose 18 to slide freely through the ring as shown in FIG. 3A. In this embodiment, the hose 18 would be reasonably taut between the ring 39 and the ends 40 and 50 of the hose. Such a loose fitting would not move the entire distance with the hose as the hose is reciprocated into and out of the housing.

A fixed hose end 40 is, in this embodiment of the invention, secured to an L-shaped connector 42 which is in turn affixed, by welding or the like, to the housing floor 44. A pipe 46 or other fitting protrudes through the housing floor to conduct power from the coupling 42 to a power receiving device (not shown). The movable end 50 of the hose protrudes from the housing front wall 56 through the housing exit 48 and is fitted with a suitable fitting or connecting device 52, such as a glad hand or 7-way electrical connector, adapted to be joined to the coupling 16 on the trailer. A compression spring 54 surrounds the movable end 50 adjacent to the connector 52 to protect the end of the hose from impacts and from sharp bending which would eventually lead to splitting and breakage of the hose end.

A roller assembly 58 is mounted on the housing front wall 56 in front of the housing exit 48. The roller assembly includes four rollers 60 mounted in apertures 62 of a support plate 64. The rollers are solid cylindrical members rotatably mounted on pins 66 secured at their ends to the support plate. These rollers form an aperture 68 bounded on each of the four sides by the movable peripheral surfaces of the rollers. Screws 70 secure the roller assembly 58 to the housing front wall 56. The rollers thus allow the hose to smoothly reciprocate through the aperture 68 while at the same time maintaining the hose away from the sides of the housing exit 48 and other sharp edges which would otherwise tear or abrade the hose.

An integrally molded wiper assembly 74 is mounted by the screws 70 on the inside of the housing front wall 56. A tapered wiper sleeve 76, having an aperture 78 slightly greater in diameter than the diameter of the hose 18, protrudes into the housing. As the hose reciprocates into and out of the housing through the roller aperture 68, the edges of the wiper aperture 78 contact the periphery of the hose to wipe debris from the hose prior to entering the housing. Such debris is thereby prevented from entering the housing.

Figure 4:
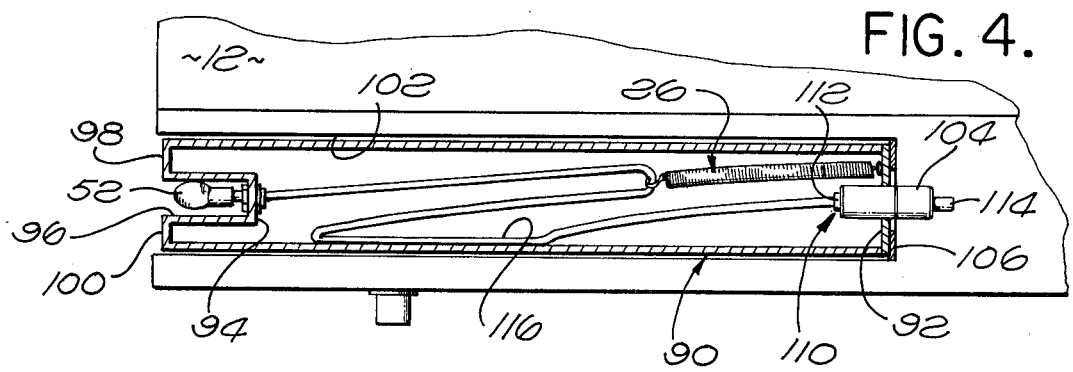
FIG. 4 is a cross-sectional elevational view of a second embodiment of this invention mounted under a truck trailer.

In a second embodiment of the invention, shown in FIG. 4, the retractable conduit system is contained in a removable housing 90. The housing is secured in a rectangular compartment 102 provided underneath the truck trailer 12 by a threaded connector 104. The connector 104 is screwed through both the rear wall 106 of the compartment 102 and the housing rear wall 92 to maintain the housing in place within the compartment. The housing front wall 94 is recessed to provide upper and lower flanges 98 and 100 respectively. These flanges form a recessed rectangular aperture 96 within which the connector 52 and the movable end of the hose are carried when the hose is fully retracted to thus protect the connector and hose end from damage due to flying debris underneath the truck and trailer.

In this embodiment of the invention, the fixed end 110 of the hose is affixed to a coupling 112. The coupling 112 is secured inside the connector 104 and is joined inside the connector with fitting 114 to transmit power from the tractor to the truck trailer utilization device. In this embodiment of the invention, it is necessary to provide a sufficient amount of hose, in the form of an extra loop 116, to allow the coupling 52 and the spring 26 secured to the hose to be fully extended. This extra loop 116 is normally equal to the length of the maximum amount of travel required for the coupling 52.

Figure 5:
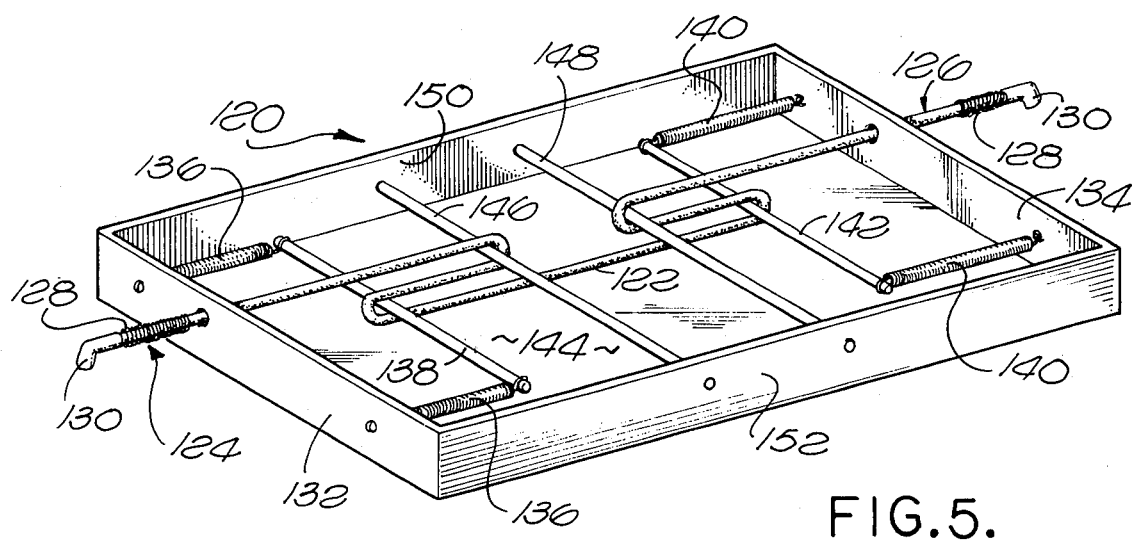
FIG. 5 is a perspective view of a third embodiment of this invention with the conduit system housing cover removed; and, FIG. 6 is a perspective, partly sectional view of a fourth embodiment of this invention.

In a third embodiment of the invention, shown in FIG. 5, a housing 120 is shown with the top wall removed and the hose 122 fully retracted into the housing. Each of first and second extensible hose ends 124 and 126 are provided with a spring protector 128 and connectors 130 of the type previously described. Either or both movable ends of the hose may be extended by pulling the hose through the roller and wiper assemblies, of the type previously described, mounted in the first and second housing end walls 132 and 134, respectively. A first pair of tension springs 136, secured at one end to the first housing end wall 132, are connected at their movable ends to opposite ends of a first movable roller bar 138. A second pair of tension springs 140, secured at one end to the second housing end wall 134, similarly have their movable ends secured to a second movable roller bar 142. The springs are preferably all affixed to the respective end walls in approximately the same horizontal plane adjacent to the housing floor 144. Two additional roller bars 146 and 148 are affixed at their ends to the housing side walls 150 and 152 in approximately a horizontal plane positioned above the horizontal plane of the spring end connections. The fixed bars 146 and 148 are aligned parallel to the housing end walls 132 and 134 and are positioned towards the center of the housing from the movable roller bars 138 and 142 when the hose is in its retracted position. The fixed roller bars 146 and 148 preferably divide the housing into approximately three equal parts, one part being between the end wall 132 and the roller 146, one part being between the two rollers 146 and 148, and one part being between the roller 148 and the end wall 134.

In order to facilitate the passage of the hose over the fixed and movable roller bars, the bars may be fitted with exterior rotatable cylindrical sleeves or the like (not shown). Alternatively, the fixed bars may be mounted on the housing side walls and on the ends of the movable bars on the springs so that the bars rotate.

As is shown in FIG. 5, the hose 122 extends through the first housing end wall 132, into the housing, and over, around and under the first fixed roller bar 146. The hose then loops back over, around and under the first spring biased movable roller 138 and preceeds across the housing floor to loop under, around and over the second spring biased movable roller bar 142. The hose exits through the second housing end wall 134 after passing under, around and over the second fixed roller bar 148. In this manner, the hose may be extended from either end by pulling the hose ends 124 or 126. As the hose is extended, the movable roller bars 138 and 142 will be pulled towards each other. A large amount of extensible hose is thus contained and protected within the housing 120 when the hose is retracted. In this embodiment of the invention, the extra hose length is measured from approximately the first fixed roller bar 146, to the movable bar 138 and from the movable bar 142 to the second fixed bar 148.

Figure 6:
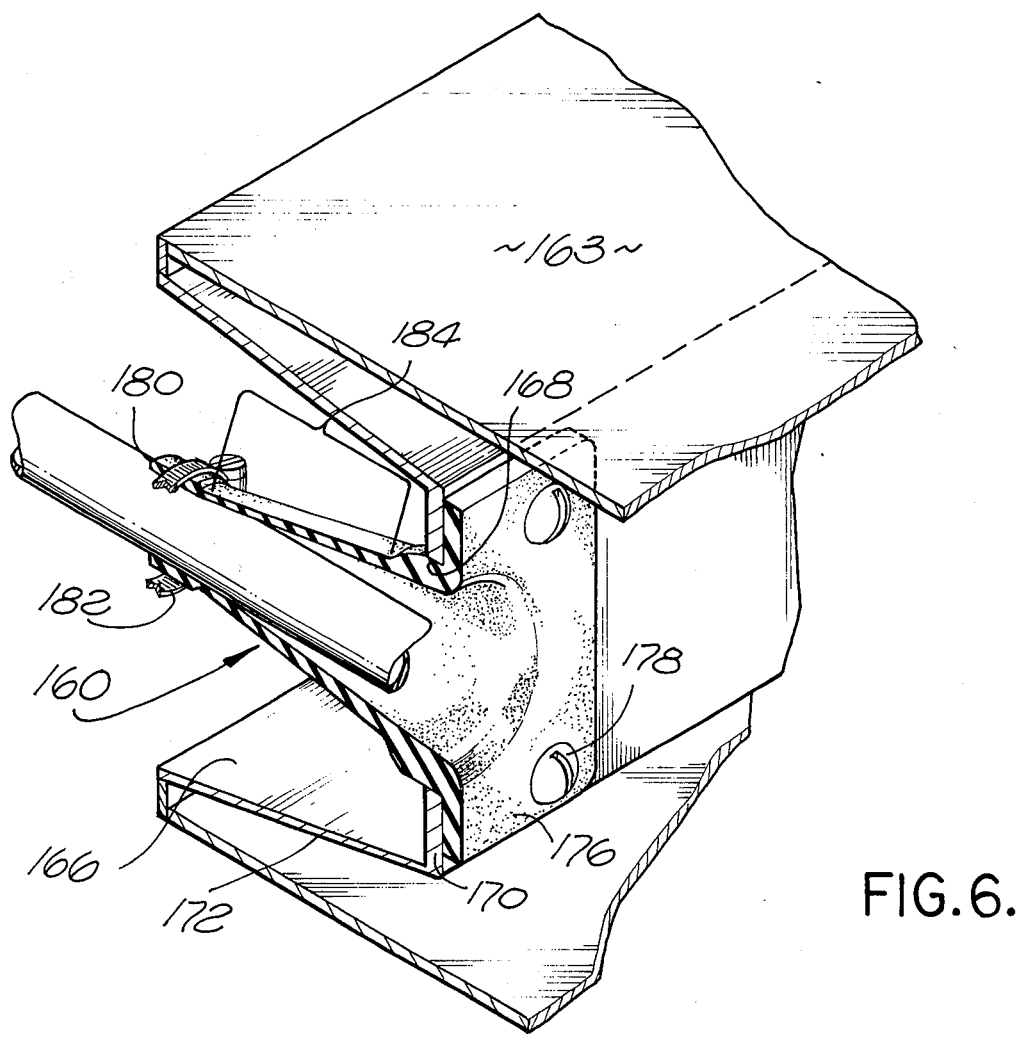

In a fourth embodiment of the invention, shown in FIG. 6, one or more of the springs employed as resilient members in the previously described embodiments are replaced by solid cylindrical resilient members or tubes 160, preferably composed of rubber or the like. While such a resilient member may be employed in connection with the conduit system of this invention in many different ways, in this embodiment of the invention the cylindrical resilient tube 160 is mounted in an aperture 166 in one end wall 162 of the housing 164. The housing flanges 172 converge inwardly from the rectangular aperture 166 towards the small circular opening 168 defined by the edges of a circular mounting flange 170 formed on the interior end of the flanges 172. The resilient tube 160 is molded with an outwardly directed integral circular flange 176 which is affixed to the circular mounting flange 170 by screws 178. The resilient tube 160 thus seals the aperture 168 to prevent debris from entering the housing. The tube 160 is thickened at both ends to bear the stress of mounting, both to the housing 164 and to the hose 174, in order to prevent breakage under the anticipated tension. The outer end 180 of the tube narrows to a diameter only slightly greater than the diameter of the hose 174 to be held within the resilient member. After one end of the hose is fed through the tube, a clamp 182 is tightened around the tube end 180 to removably secure the tube to the hose. The mid-portion 184 of the tube is thinner than the two ends in order to allow the tube to be readily stretched when the hose is pulled outwardly from the housing. In this embodiment of the invention, the mid-portion 184 allows the hose to be extended at least eight feet from its retracted position.

Various modifications and changes may be made in the described embodiments. For example, other types of resilient members might be employed, all within the scope of linear acting the invention.

What is claimed is:

1. In combination, apparatus for protecting the unextended portion of a retractable flexible hose and for maintaining the extended portion of the hose under tension, comprising:
    a tractor vehicle and a trailer vehicle pivotally coupled in tandem;
    a rigid elongated housing mounted on one of said vehicles;
    an aperture formed in one end of said housing;
    a flexible hose having the ends thereof connected to said vehicles and having an extensible portion contained within said housing, said extensible portion in a retracted position comprising a loop arranged longitudinally of said housing and being fixed to a portion of said housing adjacent said one end with said extensible portion in an extended position thereof extending outside of said housing through said aperture, said extensible portion being of sufficient length to permit extension of the hose from the housing at least the maximum distance as required for pivotal relative movement of said tractor and trailer vehicles as in turning and maneuvering during use; and,
    a linear acting coil spring having an anti-frictional sliding connector directly engaging said flexible hose at one end of the coil spring, the other end of the coil spring being fixed to an end of said housing remote from said aperture, said spring being capable of resiliently retracting said extensible portion of said flexible hose into said housing in proportion to variations in said extension of the hose during use and to maintain tension on the portion of the hose extended outside of the housing.

2. In combination, apparatus for protecting the unextended portion of a retractable flexible hose and for maintaining the extended portion of the hose under tension, comprising:
    a tractor vehicle and a trailer vehicle pivotally coupled in tandem;
    a rigid elongated housing mounted on one of said vehicles;
    an aperture formed in one end of said housing;
    a flexible hose connected to and between said vehicles and having an extensible portion contained within said housing said extensible portion in a retracted position comprising a loop arranged longitudinally of said housing and being fixed to a portion of said housing adjacent said one end; with said extensible portion in an extended position thereof extending outside of said housing through said aperture, said extensible portion being of sufficient length to permit extension of the hose from the housing at least the maximum distance as required for pivotal relative movement of said tractor and trailer vehicles as in turning and maneuvering during use; and, a linear acting tension means having at one end an anti-frictional sliding connector directly engaging said extensible portion and having the other end connected to said housing at an end of the housing remote from said aperture, said tension means being capable of retracting said extensible portion into the housing in inverse proportion to variations in said extension of the hose during use and to maintain tension on the portion of the hose extended outside of the housing.

3. An apparatus as defined in claim 2 wherein said linear acting tension means comprises a coil spring.

4. An apparatus as defined in claim 3, wherein said anti-frictional sliding connector directly engages approximately a mid-portion of that part of said extensible portion within the housing at any one time.

5. An apparatus as defined in claim 4 wherein said anti-frictional sliding connector is a ring and said part of said entensible portion is freely slidable within said ring.

* * * * *